3,287,352
N⁶-(2-HYDROXYETHYL)TUBERCIDIN AND
PROCESS THEREFOR
Paul F. Wiley, Texas Township, Kalamazoo County,
Mich., assignor to The Upjohn Company, Kalamazoo,
Mich., a corporation of Delaware
No Drawing. Filed Oct. 12, 1964, Ser. No. 403,374
2 Claims. (Cl. 260—211.5)

This invention relates to a novel organic compound and is particularly concerned with the novel N⁶-(2-hydroxyethyl)tubercidin [4-(2 - hydroxyethyl)amino-7-β-D-ribofuranosyl-7H-pyrrolo[2,3-d]pyrimidine] and a process for the production thereof.

The novel compound and the process for the production thereof can be illustratively shown by the following sequence of formulae:

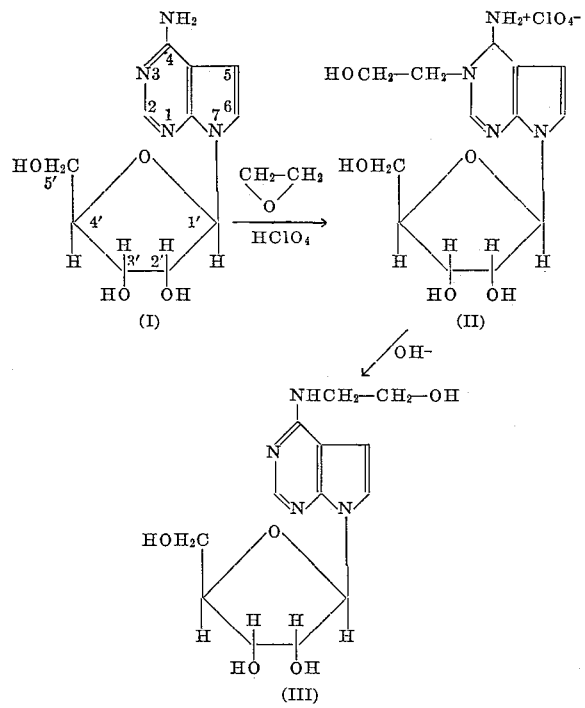

The novel process of this invention involves: reacting tubercidin, also referred to as sparsomycin A or 4-amino-7β-D-ribofuranosyl - 7H - pyrrolo[2,3 - d]pyrimidine, in water, with ethylene oxide in the presence of perchloric acid to obtain N¹-(2-hydroxyethyl)tubercidin perchlorate (II); and treating compound II with aqueous alkali to obtain N⁶-(2-hydroxyethyl)tubercidin (III).

The novel compound N⁶-(2-hydroxyethyl)tubercidin exhibits a considerable amount of cytotoxicity against KB cells, as measured in tissue cultures. Solutions containing 10 to 30 parts per million of N⁶-methyltubercidin are useful in washing instruments, vessels and gloves used in cancer tissue work to destroy any viable KB cancer cells.

In carrying out the process of the present invention, tubercidin is admixed with water containing ethylene oxide and ethylene oxide is continuously passed into the solution at room temperature for two to eight days. During the reaction the pH is maintained at about 6 to 7 by the addition of a 0.5 to 2.5% aqueous solution of perchloric acid. The product N¹-(2-hydroxyethyl)tubercidin perchlorate is obtained at the termination of the reaction in a conventional manner, such as by evaporating to dryness, and purified, if desired, by recrystallization.

The thus-obtained N¹-(2-hydroxyethyl)tubercidin perchlorate is converted to N⁶-(2-hydroxyethyl)tubercidin by treatment with an aqueous alkaline solution. In the preferred embodiment compound II without further purification is dissolved in water and enough sodium hydroxide is added to produce a pH of 11. The mixture is then heated for a period of 24 hours to a temperature between 50 and 100° C. Thereafter the solution is evaporated to dryness, preferably under reduced pressure, and the thus-obtained residue is purified in conventional manner, such as by recrystallization to give pure N⁶-(2-hydroxyethyl)tubercidin (III).

The following examples are illustrative of the process and product of the present invention, but are not to be constructed as limiting.

PREPARATION

Sparsomycin A (tubercidin)

A. FERMENTATION

A soil slant of Streptomyces sparsogenes var. sparsogenes, NRRL 2940, was used to inoculate a series of 500-ml. Erlenmeyer flasks, each containing 100 ml. of seed medium consisting of the following ingredients:

|  | Grams |
|---|---|
| Glucose monohydrate | 25 |
| Pharmamedia [1] | 25 |
| Tap water, q.s., 1 liter. | |

[1] Pharmamedia is an industrial grade of cottonseed flour produced by Traders Oil Mill Co., Fort Worth, Texas.

The seed medium presterilization pH was 7.2. The seed was grown for two days at 28° C. on a Gump rotary shaker operating at 250 r.p.m.

One shake flask of the seed described above (100 ml.) was used to inoculate a 20 liter seed tank containing 15 liters of the above sterile seed medium (S–1) plus 1 ml./l. of lard oil. The seed tank was grown for 24 hours at a temperature of 28° C., aeration rate of 10 standard liters/min., and agitated at a rate of 400 r.p.m.

The seed tank, described above, was then used to inoculate a 380-liter fermentor containing 250 liters of the following sterile medium:

| | |
|---|---|
| Glucose monohydrate | g./liter__ 10 |
| Dextrin | do____ 15 |
| Pharmamedia | do____ 20 |
| Wilson's Peptone Liquor No. 159 [1] | do____ 5 |
| Lard oil | ml./liter__ 2 |
| Tap water | Bal. |

[1] Wilson's Peptone Liquor No. 159 is a preparation of hydrolyzed proteins from animal origin.

The fermentation then proceded for 113 hours during which time the temperature was controlled at 28° C., filtered air supplied at a rate of 100 standard liters/minute, and agitation at 28 r.p.m. During the course of the fermentation, 1850 ml. of lard oil was added as an antifoam.

B. RECOVERY

The whole beer from the above fermentation was adjusted from the harvest pH of 7.1 to pH 2.4 with 350 ml. of sulfuric acid (concentrated) and filtered using 3.6% diatomaceous earth as filter aid. The filter cake was washed with 0.2 volume of deionized water, the clear beer plus wash (vol. 280 liters) was adjusted to pH 7.35 with 300 ml. of 50% aqueous sodium hydroxide and allowed to stand overnight at 10° C. The clear beer was then adjusted to pH 8 with 50 ml. of 50% aqueous sodium hydroxide and stirred for one hour with 1% decolorizing carbon and 3% diatomite The mixture was filtered and the carbon cake washed with 0.2 volume of 20% aqueous acetone. The washed carbon cake was eluted twice with 0.4 volume of 50% aqueous acetone, acidified to pH 2.5 with concentrated sulfuric acid, and the eluates pooled. The pooled acetone eluate (72 liters) was adjusted to pH 6.4 with 30 ml. of 50% aqueous sodium hydroxide and concentrated to an aqueous solution (40 liters). The concentrate was adjusted to pH 5.9 and freeze dried to give 447 g. of lyophilized material.

An additional 1126 g. was obtained by twice repeating the above fermentation and recovery. The combined lyophilized material (1573 g.) was slurried in 10 liters of methanol at 40° C. for one hour. Insoluble material was filtered off and washed three times with 500 ml. of warm methanol (40° C.). The methanol extracts and washes were combined (11.5 liters) and concentrated in vacuo to a dry preparation weighing 321 g. (HRV–25.3) and assaying 1.25 *Proteus vulgaris* biounits/mg.

C. PURIFICATION

*Partition column.*—Three hundred grams of the above preparation (HRV–25.3) was placed in a partition column which was prepared and developed in the following manner. A solvent system was made using equal volumes (350 liters) of McIlvaine's pH 6.0 buffer and methyl ethyl ketone. A slurry containing 9.6 kg. of diatomite in 60 liters of upper phase and 4.8 liters of lower phase of the above-described solvent system was poured into a 12″ column and packed with 4 p.s.i.g. of nitrogen. The column feed was dissolved in 3 liters of lower phase, slurried with 1920 g. of diatomite and enough upper phase added to make it mobile. The feed was carefully added to the top of the column bed which was covered with a layer of sea sand. The column was eluted with upper phase solvent at a rate of 2 l./minute. Four-liter fractions were collected except at the beginning and end of the column when 20-liter fractions were collected. The fractions were concentrated and bio-activities observed on *P. vulgaris* trays. At this point in the process the separation of sparsomycin and sparsomycin A was effectuated. Further processing purified these components and ultimately resulted in crystalline material.

Fractions 24–34, inclusive, from the above partition column contained the sparsomycin component.

*Purification of sparsomycin A.*—The sparsomycin A component was purified and crystallized in the following manner. Fractions 11–20, inclusive, from the previously described partition column (part C) contained the sparsomycin A component. These fractions were pooled and concentrated under reduced pressure and 7.2 grams of crystalline material was isolated. These crystals were dissolved in 400 ml. of water and 50 ml. of 0.1 N HCl. The solution was heated gently to facilitate dissolving and then filtered. The clear solution was adjusted to pH 9.0 with 50% aqueous sodium hydroxide and chilled in the refrigerator for 5 hours. The crystals were collected by filtration, washed with water, and dried to give 5.65 grams of preparation ADA–102.1. Two grams of this preparation were then dissolved in 75 ml. of water and 20 ml. of 0.1 N HCl. This clear solution was adjusted to pH 9.0 with 50% aqueous sodium hydroxide. Crystallization started immediately. The solution was left at 25° C. for 7 hours and then the crystals were collected, washed with 25 ml. of water, and dried to yield 1.52 grams of preparation ADA–105.1 having a melting point of 247.8–250° C., an optical rotation $[\alpha]_D^{25} -62°$ (c.=0.718 in 0.1 N HCl), an equivalent weight of 269, pKa' of 5.07 in water, an ultra-violet absorption spectrum in Water _____ 270 m$\mu$, a=44.14.
0.01 N H$_2$SO$_4$ ____ 227 m$\mu$, a=85.28; 271 m$\mu$, a=40.82.
0.01 N KOH _____ 270 m$\mu$, a=43.50.

a characteristic IR absorption at the following frequencies expressed in reciprocal centimeters

| | |
|---|---|
| 3350 (S) | 1198 (W) |
| 3250 (S) | 1160 (W) |
| 3145 (S) | 1134 (M) |
| 3095 (S) (sh) | 1120 (M) |
| 2880 (S) (oil) | 1093 (M) |
| 2810 (S) (oil) | 1080 (W) |
| 1895 (W) | 1055 (M) |
| 1640 (S) | 1042 (S) |
| 1592 (S) | 1017 (S) |
| 1553 (M) | 992 (S) |
| 1502 (M) | 953 (W) |
| 1475 (M) | 912 (W) |
| 1458 (S) (oil) | 903 (M) |
| 1445 (M) (sh) | 867 (M) |
| 1426 (M) | 852 (W) |
| 1370 (M) (oil) | 842 (W) |
| 1351 (M) | 799 (W) |
| 1306 (M) | 715 (W) |
| 1276 (W) | 704 (S) |
| 1255 (S) | 675 (M) |
| 1241 (M) | 658 (M) | and the following elemental analysis:

*Analysis.*—Calcd. for $C_{11}H_{14}N_4O_4$: C, 49.62; H, 5.30; N, 21.04. Found: C, 49.81; H, 5.20; N, 20.92.

EXAMPLE

$N^6$-(2-hydroxyethyl)tubercidin

A mixture of 1 g. of tubercidin and 15 ml. of water, saturated with ethylene oxide, was stirred while ethylene oxide was bubbled through during a period of five days. The pH of this mixture was maintained at all times at 6.5 by regular additions of a 1% aqueous perchloric acid solution. At the end of five days the pH of the solution was adjusted to 5.0 with perchloric acid, the solution was filtered, and the filtrate was evaporated to dryness under reduced pressure.

The resulting residue was dissolved in 40 ml. of water and the pH of the solution was adjusted to 11 with 1 N sodium hydroxide solution. The solution was heated to 60° C. for a period of 24 hours and then evaporated to dryness under reduced pressure. The thus-obtained residue was stirred with water and the mixture was refrigerated and filtered. After thorough washing, the thus-obtained product was purified by dissolving it in dilute hydrochloric acid and precipitating it from the solution with dilute sodium hydroxide. After washing and drying, the precipitated material $N^6$-(2-hydroxyethyl)tubercidin had a melting point of 210–210.5° C. and the following analysis:

*Analysis.*—Calcd. for $C_{13}H_{18}N_4O_5$: C, 50.31; H, 5.84; N, 18.06. Found: C, 50.13; H, 5.83; N, 18.11.

In the manner shown in the above example, potassium hydroxide or aqueous barium hydroxide can be used instead of sodium hydroxide to obtain $N^6$-(2-hydroxyethyl)tubercidin from $N^1$-(2-hydroxyethyl)tubercidin perchlorate.

I claim:
1. $N^6$-(2-hydroxyethyl)tubercidin having the following formula:

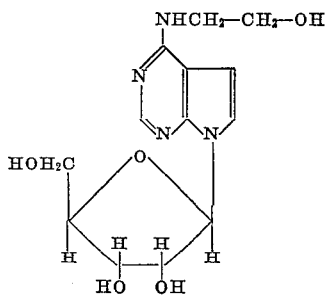

2. A process for the production of $N^6$-(2-hydroxyethyl)tubercidin which comprises: treating tubercidin with ethylene oxide in the presence of perchloric acid to obtain $N^1$-(2-hydroxyethyl)tubercidin perchlorate; and treating this salt with a base selected from the group consisting of sodium hydroxide and potassium hydroxide to obtain $N^6$-(2-hydroxyethyl)tubercidin.

No references cited.

LEWIS GOTTS, *Primary Examiner.*

JOHNNIE R. BROWN, *Assistant Examiner.*